United States Patent
Yukimasa

(10) Patent No.: US 12,445,246 B2
(45) Date of Patent: Oct. 14, 2025

(54) CONTROL APPARATUS, CONTROL METHOD, COMMUNICATION SYSTEM, AND STORAGE MEDIUM

(71) Applicant: Canon Kabushiki Kaisha, Tokyo (JP)

(72) Inventor: Koji Yukimasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 18/152,821

(22) Filed: Jan. 11, 2023

(65) Prior Publication Data
US 2023/0246772 A1  Aug. 3, 2023

(30) Foreign Application Priority Data

Feb. 1, 2022  (JP) ................................ 2022-014436

(51) Int. Cl.
| | |
|---|---|
| *H04L 5/00* | (2006.01) |
| *H04W 52/02* | (2009.01) |
| *H04W 72/0453* | (2023.01) |
| *H04W 72/1273* | (2023.01) |

(52) U.S. Cl.
CPC ....... *H04L 5/0048* (2013.01); *H04W 52/0261* (2013.01); *H04W 72/0453* (2013.01); *H04W 72/1273* (2013.01)

(58) Field of Classification Search
None
See application file for complete search history.

(56) References Cited

U.S. PATENT DOCUMENTS

| 11,382,144 B2 | 7/2022 | Ko et al. | |
|---|---|---|---|
| 2009/0111451 A1* | 4/2009 | Okita | H04W 8/245 |
| | | | 455/418 |
| 2011/0069638 A1* | 3/2011 | Ishizu | H04L 5/0064 |
| | | | 370/254 |
| 2015/0351116 A1* | 12/2015 | Shoshan | H04J 4/00 |
| | | | 370/330 |
| 2022/0408331 A1* | 12/2022 | Park | H04W 36/302 |
| 2024/0422566 A1* | 12/2024 | Tsuda | H04W 16/16 |

FOREIGN PATENT DOCUMENTS

| JP | 2020-509693 A | 3/2020 |
|---|---|---|
| WO | 2019/139298 A1 | 7/2019 |

* cited by examiner

*Primary Examiner* — Srinivasa R Reddivalam
(74) *Attorney, Agent, or Firm* — Venable LLP

(57) ABSTRACT

A control apparatus controls a base station for a local network. The control apparatus sets a transmission output value of the base station based on an instruction value received from a management apparatus that manages allocation of a frequency resource to a plurality of local networks for dynamic frequency sharing among the plurality of local networks. The control apparatus notifies the management apparatus of a set value in such a manner that the management apparatus can coordinate a use of a frequency resource among the plurality of local networks based on the set value in a case where the set value being set is below the instruction value received from the management apparatus or a transmission output value set in advance.

4 Claims, 7 Drawing Sheets

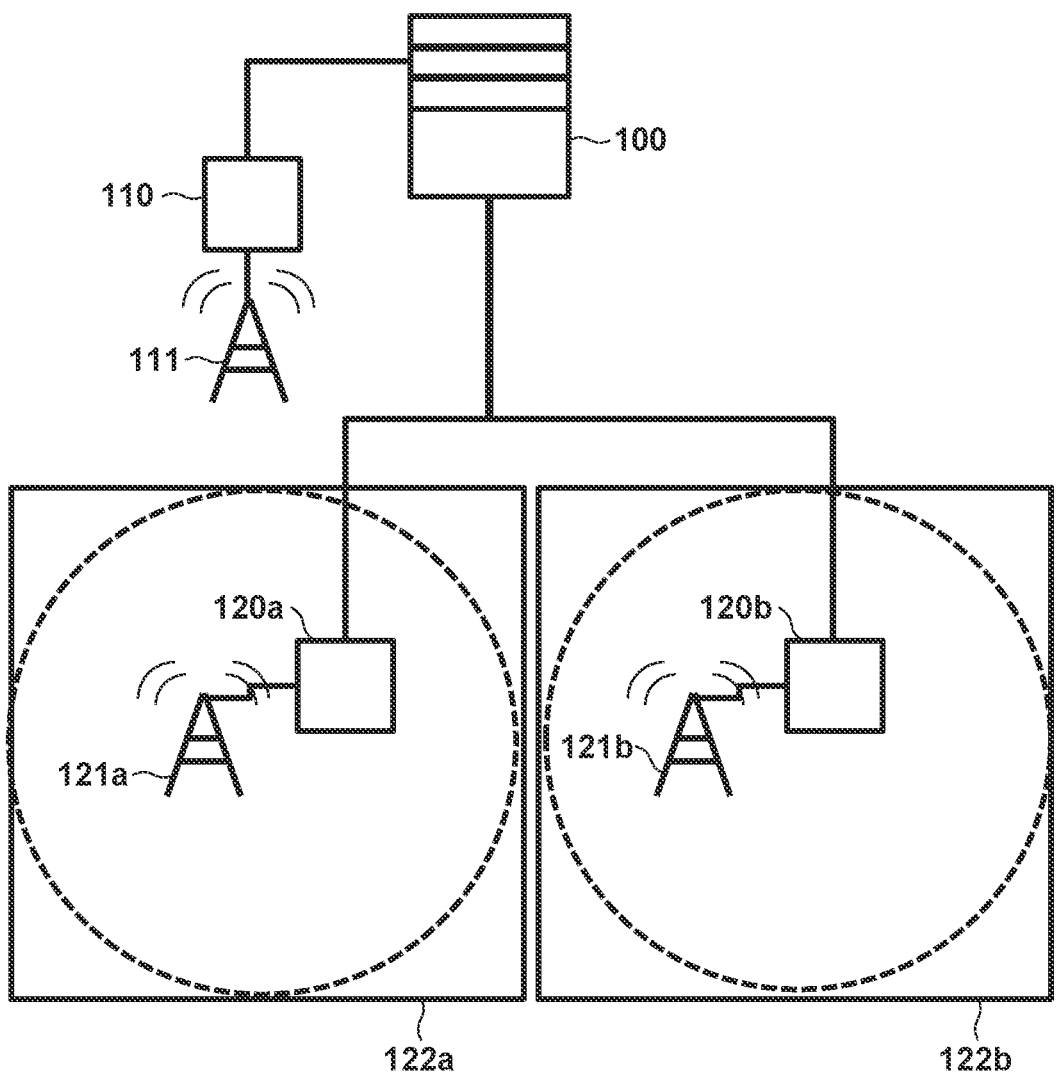

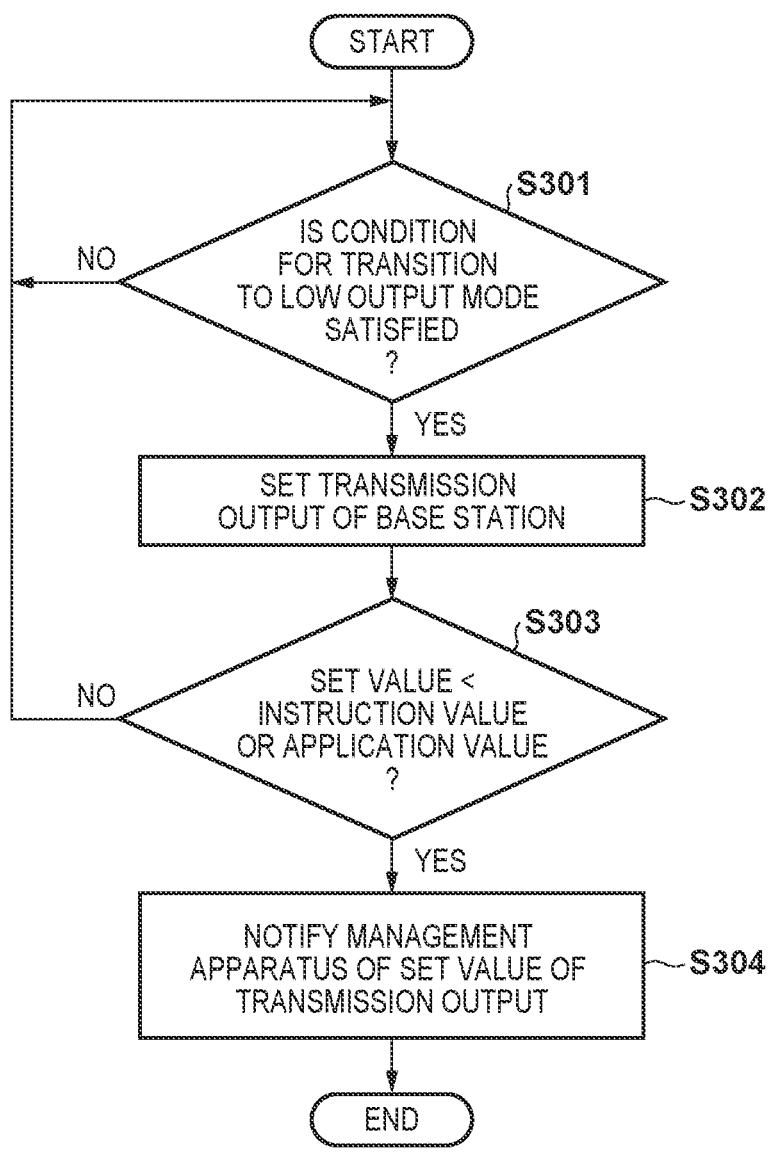

FIG. 4A

| MODE | OUTPUT VALUE [dBm] |
|---|---|
| NORMAL MODE | UPPER LIMIT VALUE |
| LOW OUTPUT MODE | UPPER LIMIT VALUE - 5 |

FIG. 4B

| MODE | OUTPUT VALUE [dBm] |
|---|---|
| NORMAL MODE | UPPER LIMIT VALUE |
| LOW OUTPUT MODE 1 (POWER SAVING LEVEL 1) | UPPER LIMIT VALUE −2 |
| LOW OUTPUT MODE 2 (SECURITY LEVEL 1) | UPPER LIMIT VALUE −4 |
| LOW OUTPUT MODE 3 (POWER SAVING LEVEL 2) | UPPER LIMIT VALUE −6 |
| LOW OUTPUT MODE 4 (SECURITY LEVEL 2) | UPPER LIMIT VALUE −8 |

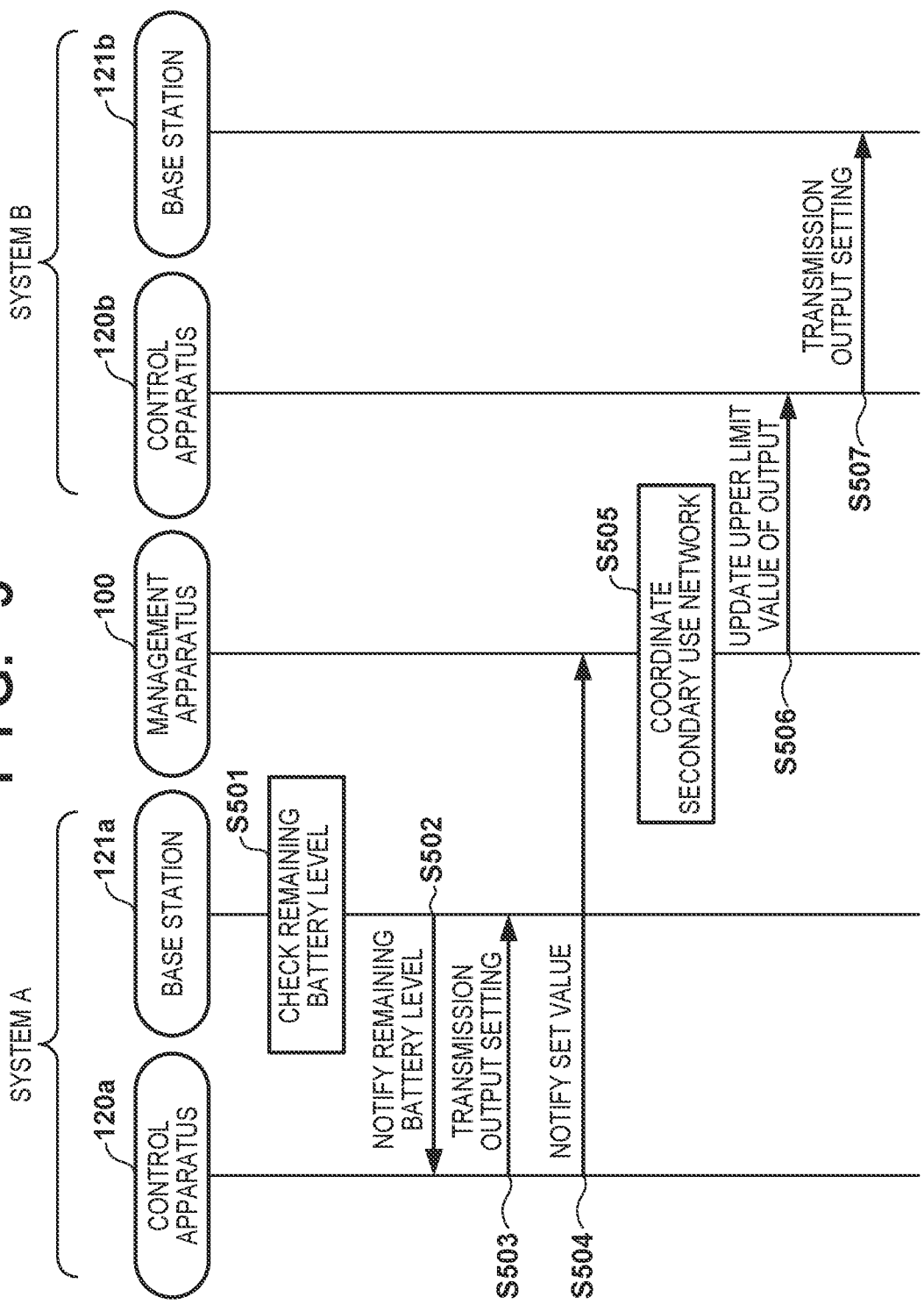

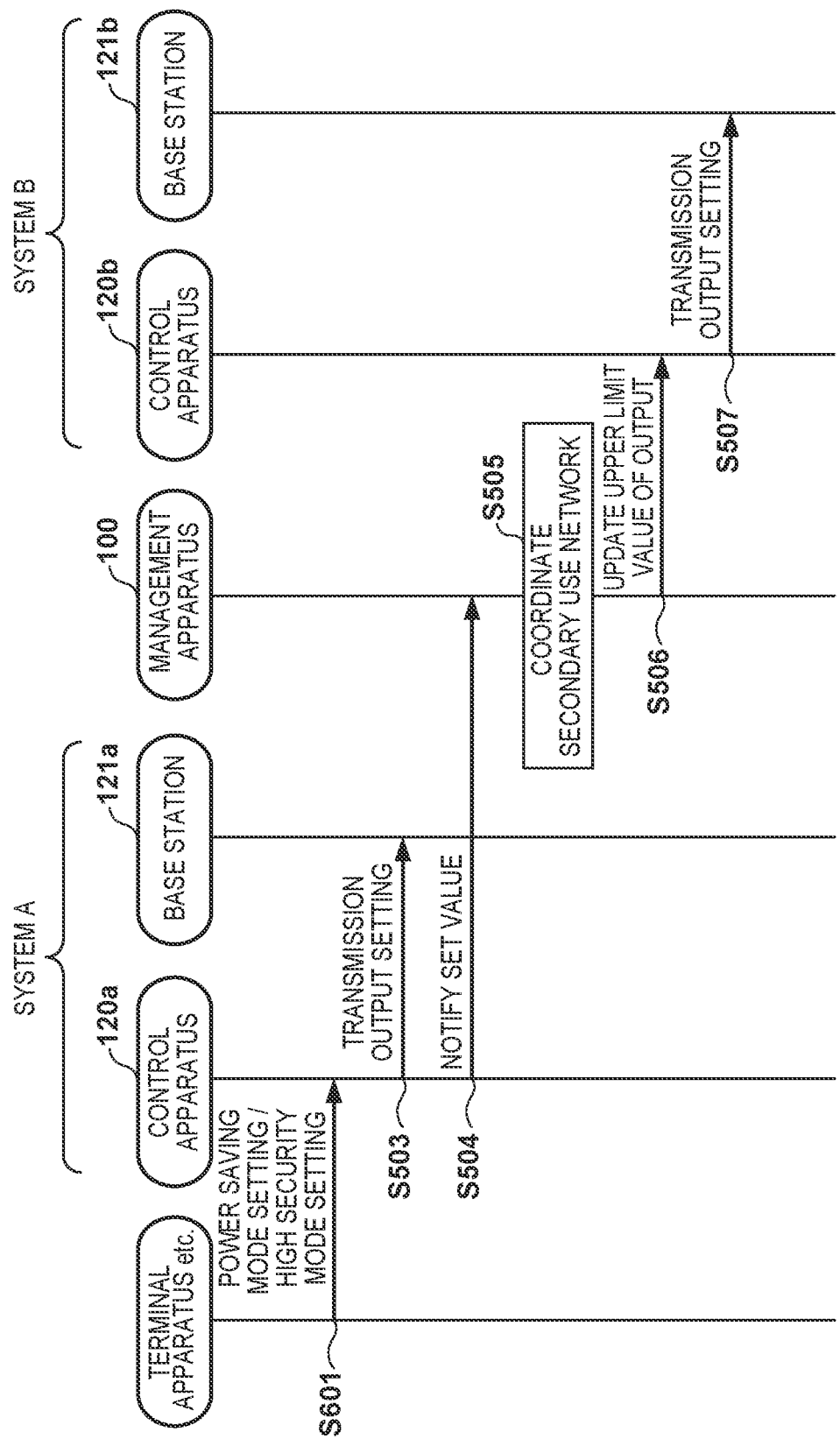

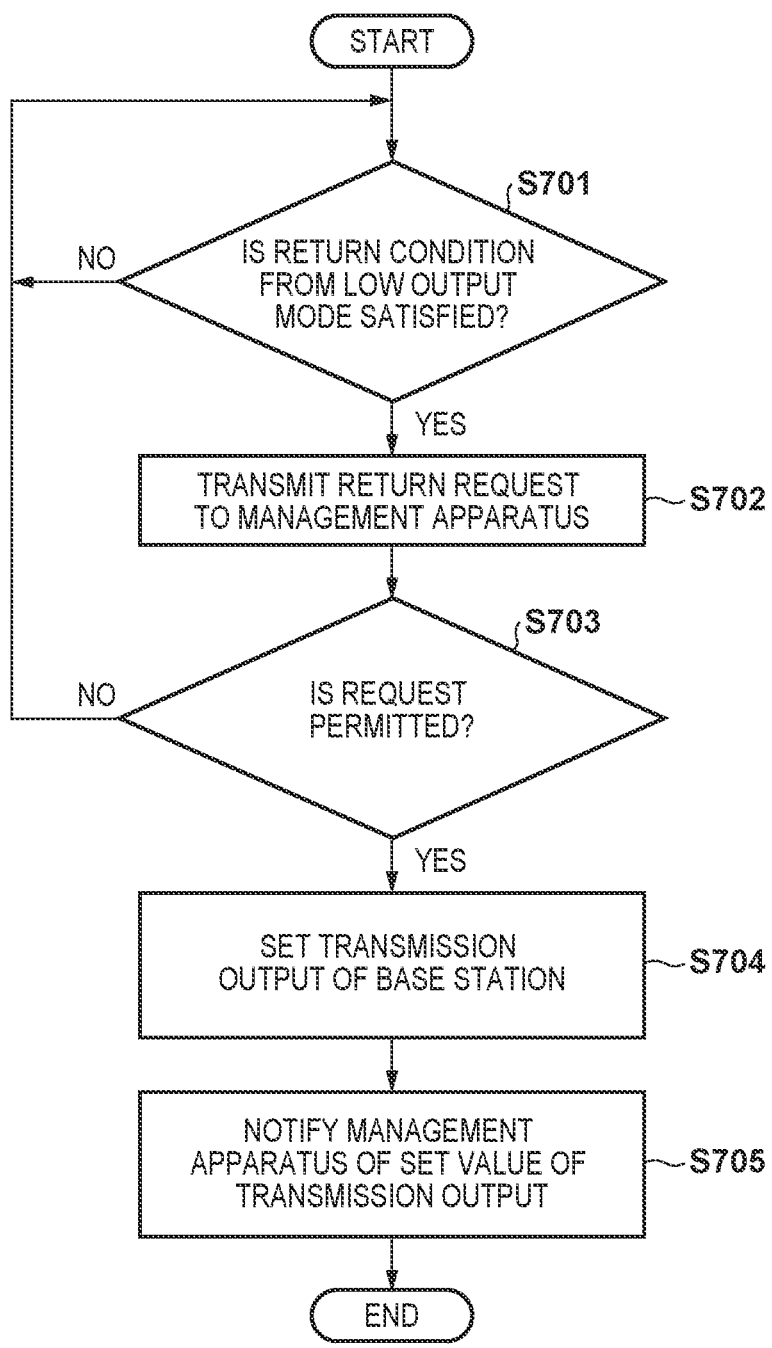

CONTROL APPARATUS, CONTROL METHOD, COMMUNICATION SYSTEM, AND STORAGE MEDIUM

BACKGROUND OF THE INVENTION

Field of the Invention

The present invention relates to a control apparatus, a control method, a communication system, and a storage medium.

Description of the Related Art

In recent years, an institutionalization for enabling business operators other than telecommunications carrier to construct and operate cellular communication networks is in progress, such as a local 5G or a regional broadband wireless access (BWA). In order to effectively use the limited frequency resource, consideration and institutionalization of dynamic frequency sharing are in progress. In the dynamic frequency sharing, the same frequency band is spatially and temporally shared by a plurality of different wireless standards. Based on the availability of a frequency resource (wireless resource) in an existing wireless communication system that is a primary user, the management apparatus in dynamic frequency sharing performs allocation of the frequency resource to the shared wireless communication system that is a secondary user, and interference coordination between secondary users. The allocation of the frequency resource by the management apparatus is preferentially performed on the primary user (primary use network) rather than the secondary user (secondary use network).

The frequency band of 4.6 to 4.8 GHz used for the local 5G network in Japan is also used for public business radio in some areas. For the frequency band in such areas, the public business radio network is defined as a primary user, and the local 5G network is defined as a secondary user. Japanese Patent Laid-Open No. 2020-509693 proposes a method of notifying a management apparatus of communication parameter information of a secondary user in order to perform use coordination between the primary user and the secondary user.

In the above-described dynamic frequency sharing, in order to prioritize a use by the primary use network, there is a case where the management apparatus instructs a control apparatus (network control apparatus) of the secondary use network to limit output level (transmission power) of a controlled base station. In this case, the control apparatus limits the output level of the base station to equal to or less than the output level (upper limit value) instructed from the management apparatus. The management apparatus performs interference coordination between secondary use networks based on the output level instructed to the network control apparatus of the secondary use network.

In a case where the management apparatus instructs the output level of the base station to a control apparatus of the secondary use network, the control apparatus may set an output level lower than the instructed output level for the base station in order to operate the base station in the power saving mode, for example. On the other hand, the management apparatus does not grasp that the control apparatus of the secondary use network performs such setting. In this case, even if a surplus output (power) is generated due to a decrease in the output level in the base station of the secondary use network, the surplus output cannot be used in another secondary use network.

SUMMARY OF THE INVENTION

Therefore, the present invention provides a technology that enables effective use of the frequency resource based on an actual transmission output of a base station between local networks that perform dynamic frequency sharing.

According to one aspect of the present invention, there is provided a control apparatus that controls a base station for a local network, comprising: at least one memory that stores a set of instructions; and at least one processor that executes the instructions, the instructions, when executed, causing the control apparatus to perform operations comprising: setting a transmission output value of the base station based on an instruction value received from a management apparatus that manages allocation of a frequency resource to a plurality of local networks for dynamic frequency sharing among the plurality of local networks; and notifying the management apparatus of a set value in such a manner that the management apparatus can coordinate a use of a frequency resource among the plurality of local networks based on the set value in a case where the set value being set is below the instruction value received from the management apparatus or a transmission output value set in advance.

According to another aspect of the present invention, there is provided a communication system, comprising: a control apparatus that controls a base station for a local network; and a management apparatus that manages allocation of a frequency resource to a plurality of local networks, which are management targets, for dynamic frequency sharing among the plurality of local networks, wherein the control apparatus comprising at least one memory that stores a set of instructions; and at least one processor that executes the instructions, the instructions, when executed, causing the control apparatus to perform operations comprising: setting a transmission output value of the base station based on an instruction value received from a management apparatus that manages allocation of a frequency resource to a plurality of local networks for dynamic frequency sharing among the plurality of local networks; and notifying the management apparatus of a set value in such a manner that the management apparatus can coordinate a use of a frequency resource among the plurality of local networks based on the set value in a case where the set value being set is below the instruction value received from the management apparatus or a transmission output value set in advance, and wherein the management apparatus is configured to coordinate a use of a frequency resource among the plurality of local networks based on the set value in a case where the set value is notified from the control apparatus.

According to still another aspect of the present invention, there is provided a control method in a control apparatus that controls a base station for a local network, the control method comprising: setting a transmission output value of the base station based on an instruction value received from a management apparatus that manages allocation of a frequency resource to a plurality of local networks for dynamic frequency sharing among the plurality of local networks; and notifying the management apparatus of a set value in such a manner that the management apparatus can coordinate a use of a frequency resource among the plurality of local networks based on the set value in a case where the set value being set is below the instruction value received from the management apparatus or a transmission output value set in advance.

According to yet another aspect of the present invention, there is provided a control method for a communication system, comprising: a control apparatus; and a management apparatus that manages allocation of a frequency resource to a plurality of local networks, which are management targets, for dynamic frequency sharing among the plurality of local networks, the control method comprising: setting, the control apparatus a transmission output value of the base station based on an instruction value received from a management apparatus that manages allocation of a frequency resource to a plurality of local networks for dynamic frequency sharing among the plurality of local networks; notifying, by the control apparatus, the management apparatus of a set value in such a manner that the management apparatus can coordinate a use of a frequency resource among the plurality of local networks based on the set value in a case where the set value being set is below the instruction value received from the management apparatus or a transmission output value set in advance; and coordinating, by the management apparatus, a use of a frequency resource among the plurality of local networks based on the set value in a case where the set value is notified from the control apparatus.

According to still yet another aspect of the present invention, there is provided a non-transitory computer-readable storage medium storing a program for causing a control apparatus to execute a control method in a control apparatus that controls a base station for a local network, the control method comprising: setting a transmission output value of the base station based on an instruction value received from a management apparatus that manages allocation of a frequency resource to a plurality of local networks for dynamic frequency sharing among the plurality of local networks; and notifying the management apparatus of a set value in such a manner that the management apparatus can coordinate a use of a frequency resource among the plurality of local networks based on the set value in a case where the set value being set is below the instruction value received from the management apparatus or a transmission output value set in advance.

Further features of the present invention will become apparent from the following description of exemplary embodiments (with reference to the attached drawings).

BRIEF DESCRIPTION OF THE DRAWINGS

FIG. 1 illustrates an exemplary network configuration;

FIG. 3 is a flowchart illustrating a procedure of processing of causing a base station to transition to a low output mode;

FIGS. 4A and 4B illustrate a relationship between a low output mode and an output value in a base station;

FIG. 5 is a sequence diagram illustrating processing by systems A and B and a management apparatus;

FIG. 6 is a sequence diagram illustrating processing by the systems A and B and the management apparatus; and FIG. 7 is a flowchart illustrating a procedure of processing of returning the base station from the low output mode.

DESCRIPTION OF THE EMBODIMENTS

Figure 2A:
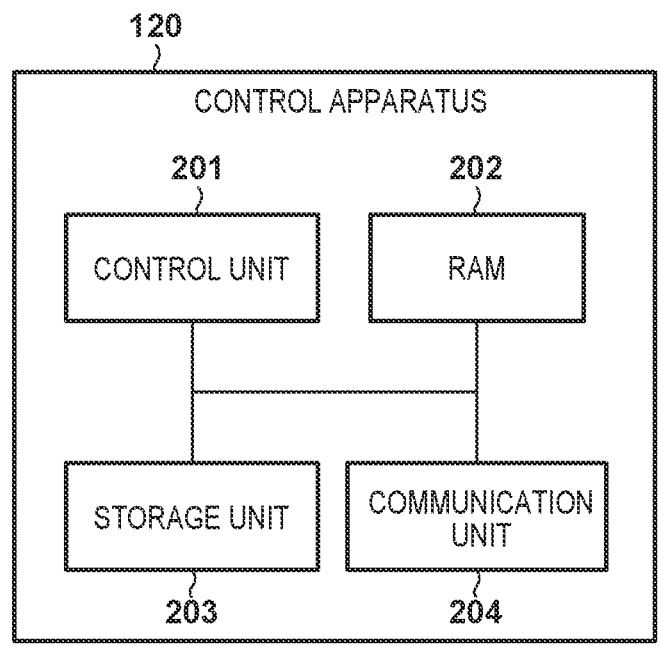
FIGS. 2A and 2B respectively illustrate a hardware configuration example and a functional configuration example of a control apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Network Configuration

FIG. 1 illustrates a network configuration example according to an embodiment of the present disclosure. In the present embodiment, the wireless communication system (primary use network) of the primary user is a wireless communication system for public business, and the wireless communication system (secondary use network) of the secondary user is a local 5G wireless communication system. The systems A and B, which are both local 5G wireless communication systems, are arranged as the secondary use network.

In the network configuration illustrated in FIG. 1, a management apparatus 100 is a management apparatus for dynamic frequency sharing between management target systems (networks), and manages the primary use network (system A) and the secondary use network (system B). The management apparatus 100 performs allocation and management of the frequency resource (wireless resource) to the primary use network and the secondary use network. The management apparatus 100 performs interference coordination such that radio wave interference does not occur between the secondary use networks. The management apparatus 100 is communicably connected to a control apparatus 110, which is a network control apparatus of the primary use network, and control apparatuses 120a and 120b, which are network control apparatuses of the secondary use network.

In the present embodiment, the management apparatus 100 is an example of a management apparatus that manages allocation of the frequency resource to a plurality of local networks for dynamic frequency sharing between the plurality of local networks (between secondary use networks). The management apparatus 100 is compliant with a sensor scheme or a database scheme as a scheme for dynamic frequency sharing. The sensor scheme is a scheme in which a usage situation of the primary use network is detected and then the frequency resource for dynamic frequency sharing is allocated. The database scheme is a scheme in which the frequency resource for dynamic frequency sharing is allocated using a database, and in the data base, a usage situation of the primary use network is registered in advance.

The control apparatus 110 controls a base station 111 of the primary use network. The base station 111 is a communication apparatus (base station apparatus) having a wireless base station function for public business radio. The control apparatus 120a controls a base station 121a of the system A. The control apparatus 120b controls a base station 121b of the system B. The base stations 120a and 120b are communication apparatuses (base station apparatuses) having a wireless base station function for the local 5G. In the example of FIG. 1, the systems A and B are respectively operated in sites 122a and 122b that are filed on application for license of the local 5G. In the present embodiment, the control apparatuses 120a and 120b are examples of a control apparatus that controls a base station for a local network. The base stations 120a and 120b are examples of a base station for a local network.

The control apparatuses 120a and 120b perform wireless communication setting respectively for the control target base stations 121a and 121b. For example, the control apparatus 120a controls a transmission output (transmission power) of the base station 121a in accordance with an instruction from the management apparatus 100. Specifically, the control apparatuses 120a and 120b respectively set the transmission output values of the base stations 121a and 121b to values equal to or less than a transmission output value (instruction value) instructed from the management apparatus 100 or value equal to or less than a predetermined value corresponding to the license application value. The license application value corresponds to a transmission output value set in advance, and is an application value in the license related to the corresponding local network.

Network Control Apparatus

FIG. 2A is a block diagram illustrating a hardware configuration example of the control apparatus 120 (120a and 120b) according to the present embodiment. The control apparatus 120 includes a control unit 201, a RAM 202, a storage unit 203, and a communication unit 204. The control unit 201 may be configured by including one or more processors (a CPU, a processing circuit, or the like). The RAM 202 may be configured by including a volatile storage medium. The storage unit 203 may be configured by including one or more nonvolatile storage media.

The control unit 201 controls the entire apparatus by reading a control program stored in the storage unit 203 into the RAM 202 and executing the control program. The storage unit 203 stores various programs such as a control program executed by the control unit 201 and various data used by the control unit 201. Processing and operations in the control apparatus 120, described below, may be implemented by the control unit 201 executing a control program stored in the storage unit 203. The communication unit 204 is a communication device (communication interface) that communicates with an external apparatus such as the management apparatus 100 and the control target base station 121 (121a and 121b).

Figure 2B:
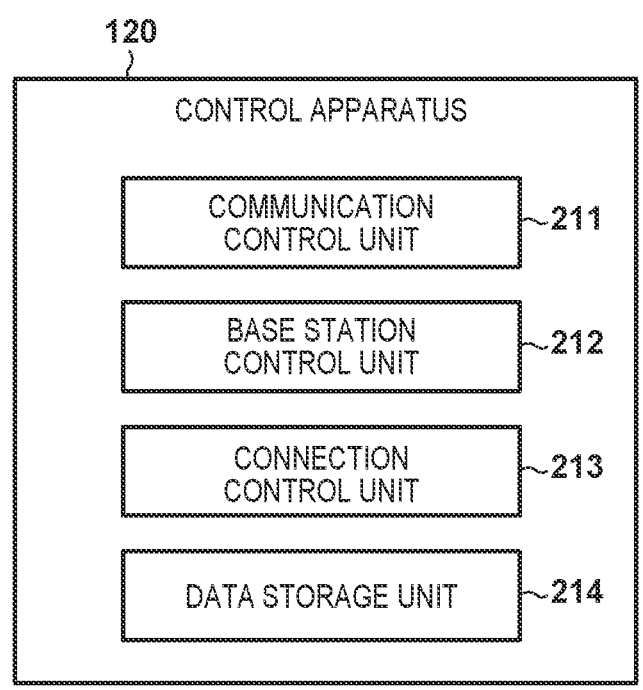

FIG. 2B is a block diagram illustrating a functional configuration example of the control apparatus 120 (120a and 120b) according to the present embodiment. The control apparatus 120 includes a communication control unit 211, a base station control unit 212, a connection control unit 213, and a data storage unit 214. The function of each block illustrated in FIG. 2B may be implemented by the control unit 201 executing a control program stored in the storage unit 203.

The communication control unit 211 controls communication with an external apparatus by the communication unit 204. The base station control unit 212 controls the control target base station 121 (121a and 121b). The connection control unit 213 performs processing related to connection and disconnection of a terminal apparatus that is wirelessly connected to the base station 121.

The data storage unit 214 holds various programs and various data (various information) by storing them in the storage unit 203. Regarding a transmission output (transmission power) of the base station 121, for example, the data storage unit 214 holds one or more of a current output value of the base station 121, an instruction value from the management apparatus 100, and a license application value. The data storage unit 214 may further hold communication data transmitted to and received from an external apparatus, setting data of the base station 121, control data, terminal data (terminal information) related to the terminal apparatus, and the like.

Transition Processing to Low Output Mode

FIG. 3 is a flowchart illustrating the procedure of processing of causing the control target base station 121 to transition to the low output mode, executed by the control apparatus 120 (the control apparatuses 120a and 120b of the systems A and B) of the present embodiment. The low output mode is an operation mode for reducing the transmission output (transmission power) of the base station 121. Both the control apparatuses 120a and 120b can execute similar processing.

First, in S301, the control unit 201 determines whether or not a transition condition for transitioning the control target base station 121 to the low output mode (a condition for decreasing the transmission output of the base station 121) is satisfied. The transition condition is, for example, conditions 1 to 3 described later. The control unit 201 advances the processing to S302 in a case where the transition condition is satisfied (for example, any of the conditions 1 to 3 is satisfied), and repeats the determination processing of S301 in a case where the transition condition is not satisfied. In this manner, the control unit 201 executes the processing in and after S302 in response to satisfaction of the transition condition to the low output mode for the base station 121.

The above transition conditions may include, for example, the following three conditions 1 to 3.

Condition 1: At least any of the control apparatus 120 and its control target base station 121 is driven by a battery, and the remaining battery level becomes equal to or less than a predetermined value in any of the control apparatus 120 and the base station 121.

Condition 2: A power mode of at least any of the control apparatus 120 and its control target base station 121 is set to a power saving mode.

Condition 3: The security mode of at least any of the control apparatus 120 and its control target base station 121 is set to a mode of a higher security level (high security mode).

For example, in a case where the condition 1 is satisfied in the base station 121, the base station 121 is caused to transition to the low output mode in order to drive the base station 121 for a longer time with the remaining battery level. In a case where the condition 2 is satisfied in the base station 121, the base station 121 is caused to transition to the low output mode in order to reduce the power consumption of the base station 121. In a case where the condition 3 is satisfied in the base station 121, the base station 121 is caused to transition to the low output mode in order to increase the security level by shortening the reach distance of the radio wave transmitted from the base station 121 at the time of transmission of highly confidential data. The transition condition to the low output mode is not limited to the above-described conditions 1 to 3.

In S302, the control unit 201 sets the transmission output (transmission power) of the control target base station 121. The control unit 201 can set the transmission output value of the base station 121 with an instruction value received from the management apparatus 100 and a license application value as upper limit values. In the control apparatus 120, for example, as illustrated in FIGS. 4A and 4B, one or more low output modes for decreasing the transmission output of the control target base station 121 are determined in advance, and each of the low output modes is associated with a transmission output value. In S302, the control unit 201 sets the transmission output value of the base station 121 to a value determined in advance corresponding to the low output mode of the base station 121. In this manner, the control unit 201 sets the transmission output value of the base station 121 based on the instruction value received from the management apparatus 100.

In the example of FIG. 4A, (upper limit value−5) [dBm] is determined as the transmission output value corresponding to the low output mode of the base station 121. In the example of FIG. 4B, low output modes 1 to 4 of the base station 121 are determined in accordance with the power saving level and the security level, and the transmission output value of the base station 121 is determined in advance for each low output mode. The transmission output values corresponding to the respective low output modes illustrated in FIGS. 4A and 4B may be held in the storage unit 203 in advance. The control unit 201 may set the transmission output value (transmission power) to 0 (that is, set not to output radio waves). In this case, a low output mode for setting the transmission output value to 0 may be included in the one or more low output modes described above.

Next, in S303, the control unit 201 determines whether or not the set value of the transmission output of the base station 121 is below the instruction value received from the management apparatus 100 or the license application value as a result of the setting in S302. In S303, the control unit 201 returns the processing to S301 in a case where the set value of the transmission output of the base station 121 is not below the instruction value from the management apparatus 100 or the license application value. On the other hand, the control unit 201 advances the processing to S304 in a case where the set value of the transmission output of the base station 121 is below the instruction value from the management apparatus 100 or the license application value.

In S304, the control unit 201 notifies the management apparatus 100 of the set value of the transmission output of the control target base station 121 such that the management apparatus 100 can coordinate the use of the frequency resource between the plurality of local networks (between the systems A and B) based on the set value of the transmission output. Thereafter, the control unit 201 ends the processing.

Example of Control Sequence

FIG. 5 is a sequence diagram illustrating an example of the processing by the systems A and B corresponding to the secondary use network and the management apparatus 100. FIG. 5 illustrates an example of a control sequence in a case where the base station 121a of the system A is driven by the battery, and the control apparatus 120a causes the base station 121a to transition to the low output mode in response to the satisfaction of the above-described condition 1 in the base station 121a.

The base station 121a checks the remaining battery level (S501), and, in a case where the remaining battery level becomes equal to or less than a predetermined value, transmits, to the control apparatus 120a, a notification indicating that the remaining battery level is equal to or less than the predetermined value (S502). Upon receiving the notification from the base station 121a, the control apparatus 120a determines that the above-described condition 1 is satisfied ("YES" in S301), and performs transmission output setting for the base station 121a (S503 and S302). The transmission output setting may be performed using the transmission output value corresponding to the low output mode illustrated in FIGS. 4A and 4B described above, for example. In a case where the set value of the transmission output of the base station 121a is below the instruction value from the management apparatus 100 or the license application value ("YES" in S303), the control apparatus 120a transmits, to the management apparatus 100, a notification (set value notification) including the set value of the transmission output of the base station 121a (S504 and S304).

Upon receiving the set value notification from the control apparatus 120a, the management apparatus 100 performs, based on the notified set value, coordination processing of coordinating the use of the frequency resource between the plurality of local networks (secondary use networks) under management (S505). In this coordination processing, the management apparatus 100 coordinates the secondary use network based on information such as the positions of the base stations 121a and 121b of the secondary use network and the set value of the transmission output of each of the base stations. For example, the management apparatus 100 performs interference coordination such that radio wave interference does not occur between the secondary use networks (in this example, between the system A and the system B). The management apparatus 100 makes a surplus output, which is generated by decreasing the transmission output (transmission power) in one base station of the secondary use network, available in a base station of another secondary use network (system B).

In the present example, by decreasing the transmission output (transmission power) in the base station 121a of the system A, the management apparatus 100 can increase the upper limit value of the transmission output in the base station 121b of the system B within a range where the radio wave interference does not occur between the systems A and B. In this case, the management apparatus 100 coordinates the secondary use network by updating the upper limit value of the transmission output in the base station 121b of the system B to a higher value. By performing such coordination on the secondary use network that is a management target, the frequency resource (wireless resource) between the secondary use networks can be effectively used.

Specifically, the management apparatus 100 updates the upper limit value (instruction value) of the transmission output in the base station 121b of the system B, and transmits, to the control apparatus 120b of the system B, a notification indicating the updated upper limit value (S506). Thus, based on the set value notified from the control apparatus 120a of a first local network (system A) of the plurality of local networks (systems A and B), the management apparatus 100 instructs the control apparatus 120b of a second local network (system B) to increase the transmission output of the base station 121b of the second local network (system B).

Upon receiving the above notification from the management apparatus 100, the control apparatus 120b may set the transmission output value of the base station 121b within a range equal to or less than the upper limit value indicated by the notification (S507).

FIG. 6 is a sequence diagram illustrating another example of the processing by the systems A and B corresponding to the secondary use network and the management apparatus 100. FIG. 6 illustrates an example of a control sequence in a case where the control apparatus 120a causes the base station 121a to transition to the low output mode in response to the satisfaction of the above-described conditions 2 or 3 in the base station 121a.

The control apparatus 120a receives a notification indicating that the power saving mode or the high security mode is set from, for example, a sensor, the terminal apparatus, or the control unit 201 of the control apparatus 120a (S601). In response to this notification, the control apparatus 120a executes the processing in and after S503 in the same manner as in FIG. 5. The notification in S601 may be received from the base station 121a.

Return Processing from Low Output Mode

FIG. 7 is a flowchart illustrating the procedure of processing of returning the control target base station 121 from the low output mode, executed by the control apparatus 120 (the control apparatuses 120a and 120b of the systems A and B) of the present embodiment. The processing of FIG. 7 is performed to return, to the normal value, the transmission output value of the base station 121, which has been decreased by the processing of FIG. 3. Both the control apparatuses 120a and 120b can execute similar processing.

First, in S701, the control unit 201 determines whether or not a return condition for returning from the low output mode (to the normal mode) is satisfied for the control target base station 121 (whether or not to return the base station 121 from the low output mode). The return condition is determined as follows corresponding to the above-described transition condition, for example.

Condition 1: The remaining battery level becomes equal to or greater than a predetermined value in at least any of the control apparatus 120 and its control target base station 121.

Condition 2: A power mode of at least any of the control apparatus 120 and its control target base station 121 is set to a normal power mode (cancellation of the power saving mode is set).

Condition 3: The security mode of at least any of the control apparatus 120 and its control target base station 121 is set to the normal security mode (cancellation of the high security mode is set).

The control unit 201 advances the processing to S702 in a case where the return condition is satisfied (for example, any of the conditions 1 to 3 is satisfied), and repeats the determination processing of S701 in a case where the return condition is not satisfied. In this manner, the control unit 201 executes the processing in and after S702 in response to satisfaction of the return condition from the low output mode for the base station 121.

In S702, the control unit 201 transmits, to the management apparatus 100, a request for returning the transmission output (transmission power) of the control target base station 121 to the output before transition to the low output mode (return request for returning from the low output mode to the normal mode). Upon receiving the return request from the control apparatus 120, the management apparatus 100 determines whether or not to permit return from the low output mode, and returns a response including a determination result to the control apparatus 120.

Thereafter, in S703, the control unit 201 determines whether or not the return from the low output mode is permitted based on the response received from the management apparatus 100. The control unit 201 returns the processing to S701 in a case where the return is not permitted, and advances the processing to S704 in a case where the return is permitted.

In S704, the control unit 201 sets the transmission output of the base station 121 to return the transmission output (transmission power) of the control target base station 121 to the output before transition to the low output mode. That is, the control unit 201 sets the transmission output value of the base station 121 to a value (normal value) before transition to the low output mode. Finally, in S705, the control unit 201 notifies the management apparatus 100 of the set value of the transmission output of the control target base station 121, and ends the processing.

As described above, the control apparatus 120 (120a and 120b) controls the base station 121 (121a and 121b) for the local network. The management apparatus 100 manages allocation of the frequency resource to a plurality of local networks for dynamic frequency sharing among the plurality of local networks. The control apparatus 120 sets the transmission output value of the control target base station 121 based on the instruction value received from the management apparatus 100. In a case where the set value being set is below the instruction value received from the management apparatus 100 or the transmission output value set in advance (license application value), the control apparatus 120 notifies the management apparatus 100 of the set value such that the management apparatus 100 can coordinate a use of the frequency resource among the plurality of local networks based on the set value.

The management apparatus 100 coordinates a use of the frequency resource among local networks (among secondary use networks) that perform dynamic frequency sharing based on the set value of the transmission output of the base station 121 notified from the control apparatus 120. Specifically, the surplus output caused by the decrease in the transmission output is made available in the base station of another secondary use network (system B). This, according to the present embodiment, it is possible to effectively use the frequency resource based on the actual transmission output of the base station 121 among the local networks that perform dynamic frequency sharing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-014436, filed Feb. 1, 2022, which is hereby incorporated by reference herein in its entirety.

What is claimed is:

1. A communication system, comprising:
a control apparatus that controls a base station for a local network; and
a management apparatus that manages allocation of a frequency resource to a plurality of local networks, which are management targets, for dynamic frequency sharing among the plurality of local networks,
wherein the control apparatus comprising at least one memory that stores a set of instructions; and at least one processor that executes the instructions, the instructions, when executed, causing the control apparatus to perform operations comprising:
setting a transmission output value of the base station based on an instruction value received from a management apparatus that manages allocation of a frequency resource to a plurality of local networks for dynamic frequency sharing among the plurality of local networks; and
notifying the management apparatus of a set value in such a manner that the management apparatus can coordinate a use of a frequency resource among the plurality of local networks based on the set value in a case where the set value being set is below the instruction value received from the management apparatus or a transmission output value set in advance,
wherein the management apparatus is configured to coordinate a use of a frequency resource among the plurality of local networks based on the set value in a case where the set value is notified from the control apparatus, and
wherein the management apparatus is configured to instruct a control apparatus of a second local network to increase transmission output of a base station of the second local network based on the set value notified from the control apparatus of a first local network among the plurality of local networks.

2. The communication system according to claim 1, wherein
the management apparatus manages the plurality of local networks that are secondary use networks, and a primary use network in which allocation of a frequency resource is prioritized over the secondary use network, and
the management apparatus is compliant with a sensor scheme in which a usage situation of the primary use network is detected and then a frequency resource for the dynamic frequency sharing is allocated, or a database scheme in which a frequency resource for the dynamic frequency sharing is allocated using a database in which a usage situation of the primary use network is registered in advance.

3. A control method for a communication system, comprising: a control apparatus; and a management apparatus that manages allocation of a frequency resource to a plurality of local networks, which are management targets, for dynamic frequency sharing among the plurality of local networks, the control method comprising:
setting, the control apparatus a transmission output value of the base station based on an instruction value received from a management apparatus that manages allocation of a frequency resource to a plurality of local networks for dynamic frequency sharing among the plurality of local networks;
notifying, by the control apparatus, the management apparatus of a set value in such a manner that the management apparatus can coordinate a use of a frequency resource among the plurality of local networks based on the set value in a case where the set value being set is below the instruction value received from the management apparatus or a transmission output value set in advance;
coordinating, by the management apparatus, a use of a frequency resource among the plurality of local networks based on the set value in a case where the set value is notified from the control apparatus; and
instructing a control apparatus of a second local network to increase transmission output of a base station of the second local network based on the set value notified from the control apparatus of a first local network among the plurality of local networks.

4. The control method according to claim 3, wherein
the management apparatus manages the plurality of local networks that are secondary use networks, and a primary use network in which allocation of a frequency resource is prioritized over the secondary use network, and
the management apparatus is compliant with a sensor scheme in which a usage situation of the primary use network is detected and then a frequency resource for the dynamic frequency sharing is allocated, or a database scheme in which a frequency resource for the dynamic frequency sharing is allocated using a database in which a usage situation of the primary use network is registered in advance.

* * * * *